Aug. 7, 1951 W. L. MASTERSON 2,563,731
LAND, SEA, AND AIR PLANE
Filed April 17, 1945 5 Sheets-Sheet 4

INVENTOR.
WILBER L. MASTERSON

Aug. 7, 1951 W. L. MASTERSON 2,563,731
LAND, SEA, AND AIR PLANE
Filed April 17, 1945 5 Sheets-Sheet 5

INVENTOR.
WILBER L. MASTERSON

Patented Aug. 7, 1951

2,563,731

UNITED STATES PATENT OFFICE 2,563,731

LAND, SEA, AND AIR PLANE

Wilbur L. Masterson, Bay Shore, N. Y.

Application April 17, 1945, Serial No. 588,813

1 Claim. (Cl. 244—2)

My present invention, in its broad aspect, has to do with improvements in vehicles designed to travel in the air after the manner of a helicopter or aeroplane, to travel on the ground after the manner of an automobile, or the like, or to travel upon the water after the manner of a boat, or the like. To that end, I have provided a unique and improved body or fuselage which is streamlined and waterproof and has a general arrangement not incompatible with a streamlined body of an automobile, and which has three ground engaging wheels, two of which are forward and one wheel (the propulsion wheel) in the rear and cushioned to sustain the shock of a three point landing when my device is used as an aircraft, and the forward two wheels of which are arranged for steering. The cabin of my body or fuselage is roomy and comfortable, and the controls are located forward while the power plant is between the ends, and drives both the propeller blades and traction wheels. My propeller is of the change pitch type, there being novel and improved means for changing pitch, and the entire propeller assembly is movable (or retractable) to a position housed within the outer shell of the body to be out of the way when my vehicle is to be used after the manner of an automobile or boat. While I have not shown structure in detail, a water propeller may be mounted in the back to propel the vehicle in the water, or as shown herewith, the traction wheel has flat spokes to serve as paddles for propelling my vehicle in the water. The outer streamlined shell of my body or fuselage is simply and sturdily formed with an upper and a lower section (with the wheels mounted in leak-proof depressions in the lower section) joined along a medial line which is fitted to serve as a bumper. Doors cover the compartment for the propeller assembly, and the power plant and motor of the operating structure is between the walls of the cabin and outer shell.

My vehicle will fly and land vertically, and will fly forward, backward and sideways, or hover over one spot, and will land or take off from water or land. The vehicle is simple and compact enough to be housed in a garage.

The propeller blades are mounted on a hub assembly to be moved up and down by a ratchet and rack. The blades are foldable and have two sets of pitch controls which are operated from the steering wheel. A lever is provided to change the pitch for forward and rearward flight. By virtue of a clutch, the hub assembly and blades continue to rotate until a landing is made. The blades are in sets; two travelling clockwise and two counter-clockwise, and more than two blades to a set may be used. By this means torque is reduced to a minimum.

My propeller assembly and control and actuating mechanism is simple, sturdy and easily operated to give the desired results in the most practical and efficient manner.

Other and equally important objects and advantages of my invention will be apparent from the following description and drawings, and it is pointed out that changes in form, size, shape, materials, and construction and arrangement of parts is permissible and within the purview of my broad inventive concept, and the scope of the appended claim.

In the drawings, wherein I have illustrated a preferred form of my invention:

In the drawings, wherein like characters of reference are used to designate like or similar parts.

Figure 1:
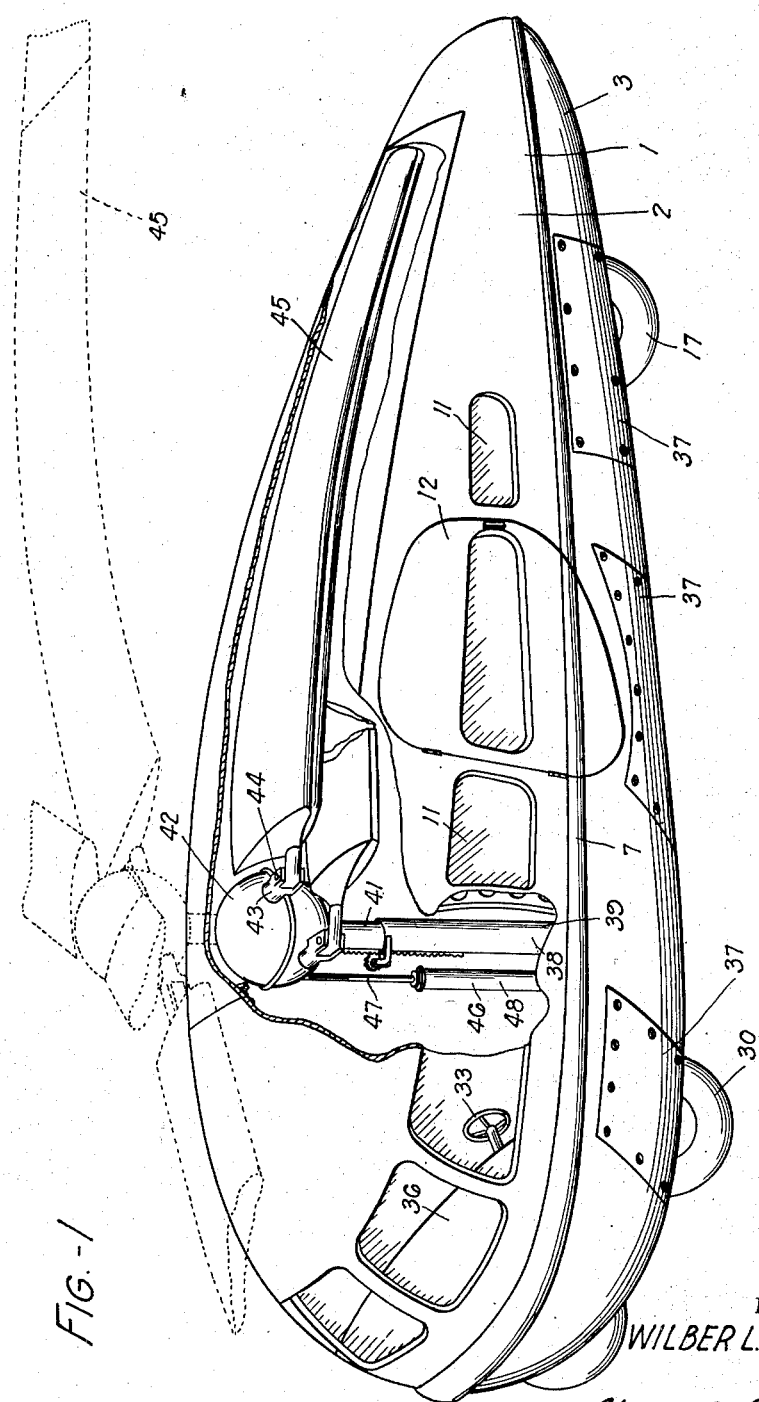
Figure 1 is a perspective view of my device with the wings folded and housed in the body or fuselage to be used as a road vehicle, and partly broken away.

The body or fuselage 1 is streamlined, being tear-drop shaped and is formed with an upper section 2 and a lower section 3; these are reinforced transversely at intervals as at 4 and are detachably joined at their edges to a longitudinal member or beam 5, having edge flanges 6 to which the upper and lower sections are attached. A resistant bumper 7 is fixed to the member 5. Within the sections is the cabin 8 which is spaced as at 9 from the walls of the sections except at the front 10, and windows 11 and a door 12 are provided. The seats 13 are mounted on the flat floor 14 of the cabin, and a removable floor section may be provided to give access to the power plant 15 which is in the space beneath the cabin, under the rear seat, and about midway the length of the body. Mounted in a watertight compartment 16 centrally and toward the rear end of the body and opening downwardly is a resilient tired rear traction wheel 17. The wheel has flat spokes 18 which may function as paddles to propel the body in the water if the water depth is not over the spokes, and an axle 19 which is journalled in side bars 20 pivoted as at 21 to a transverse shaft 22, forwardly of the rear wheel. A pivoted cushioning device 23 on each side of the wheel engages the hub so that the wheel will absorb shocks of landing or declivities in the road. A transmission assembly 24 is coupled with the drive shaft 25 to the power plant 15 and with a sprocket 26 over which a chain 27 is trained to the driven sprocket 28 on the wheel axle 19 to drive the vehicle.

Figure 2:
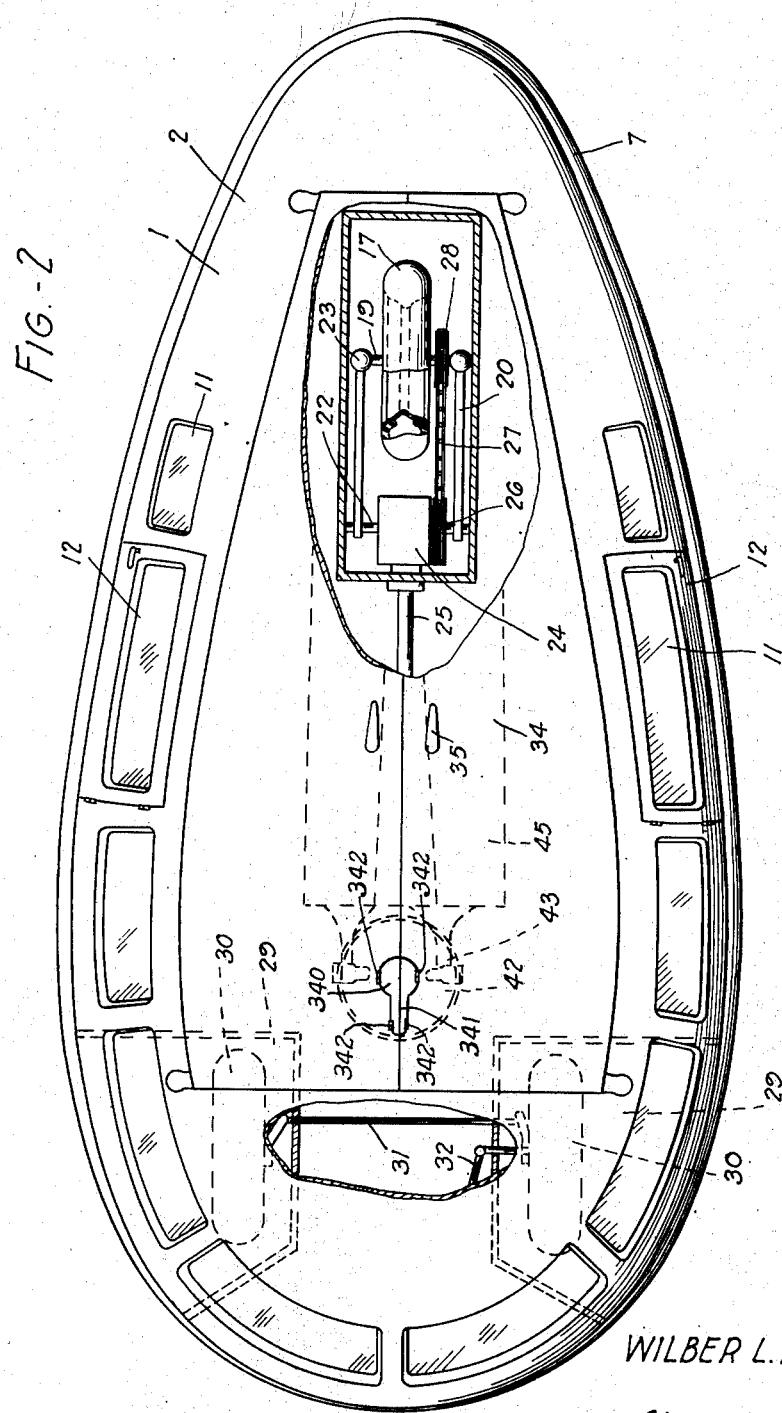
Figure 2 is a top plan view partly broken away.
Figure 3:
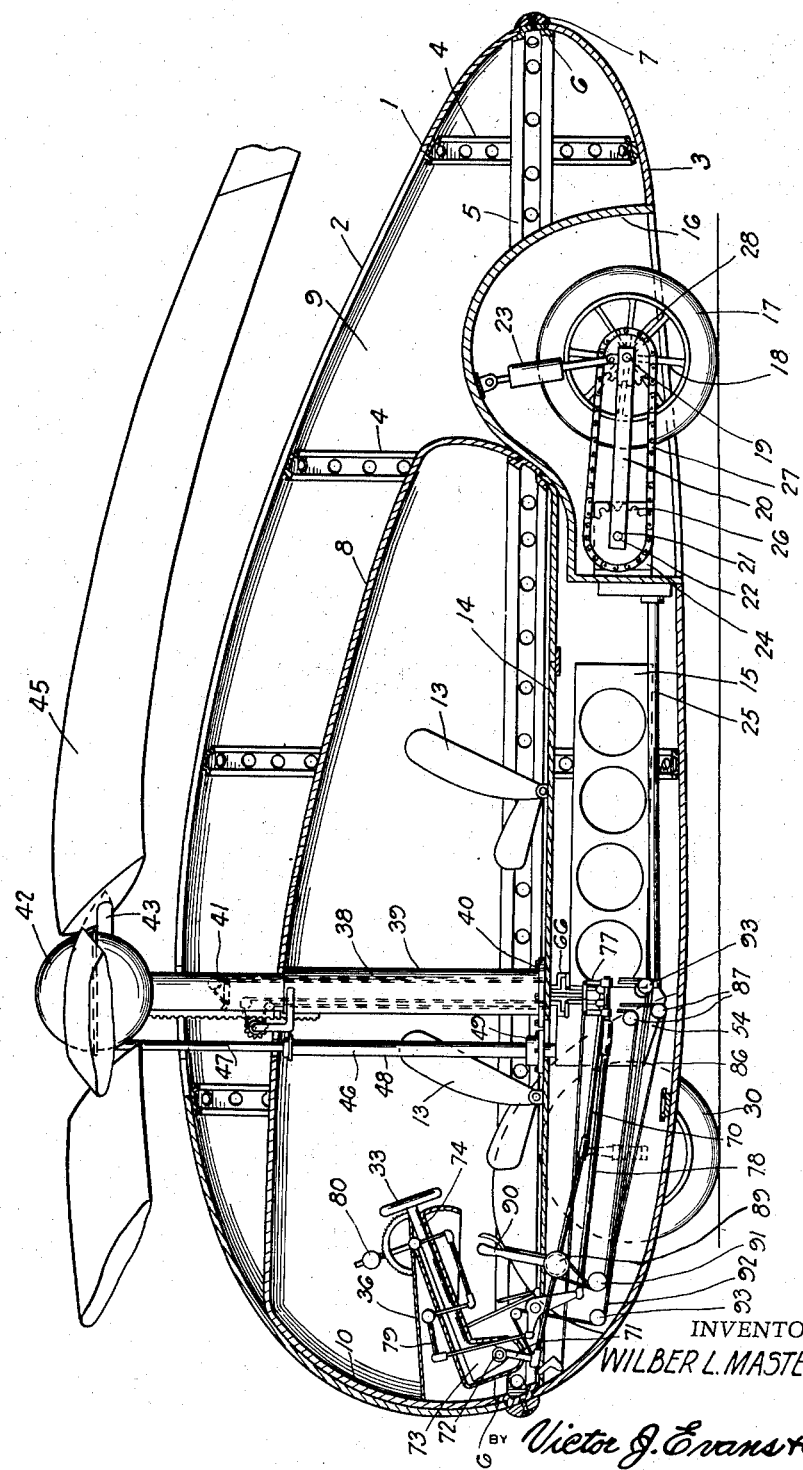
Figure 3 is a longitudinal section with the parts arranged for flight after the manner of an aeroplane or helicopter.
Figure 4:
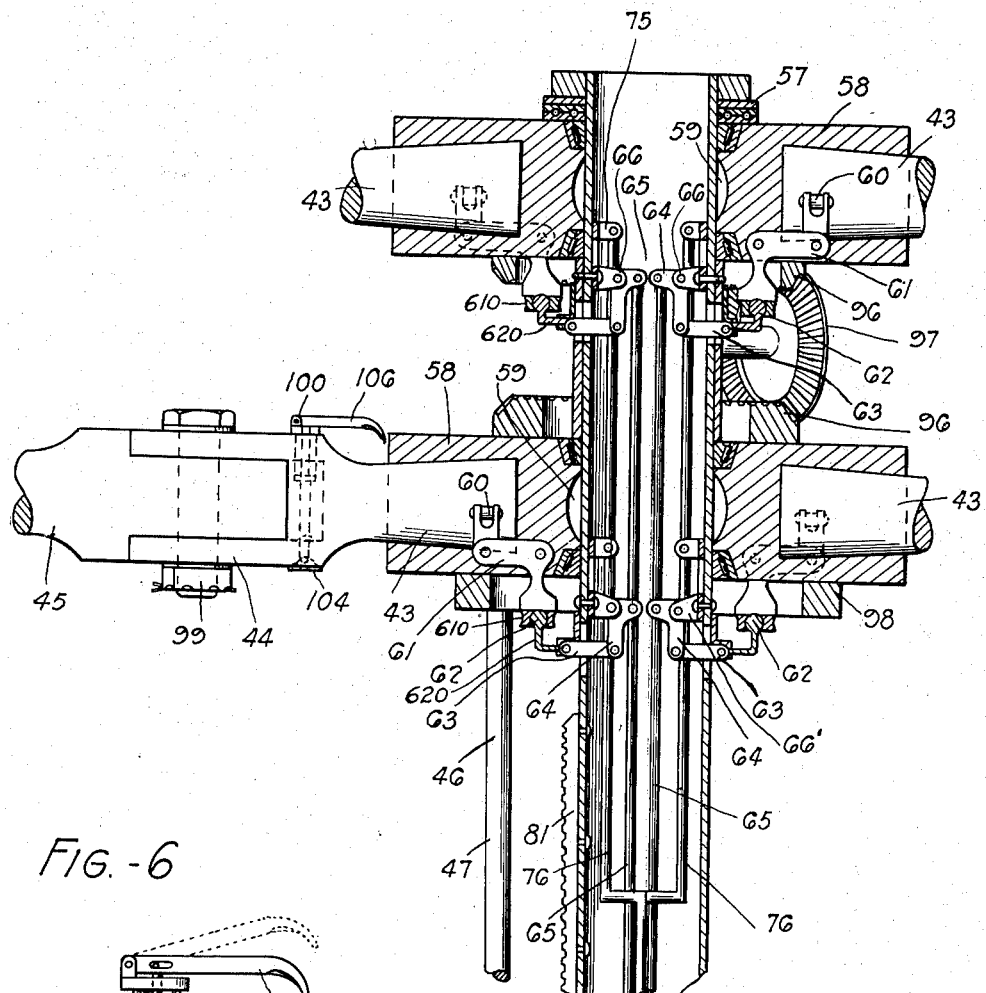
Figure 4 is a vertical section through the upper portion of my propeller and hub and controls and drive means.
Figure 6:
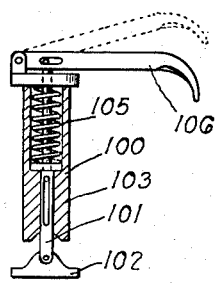
Figure 6 is a detached section of the wing latching means to hold the wings extended.
Figure 5:
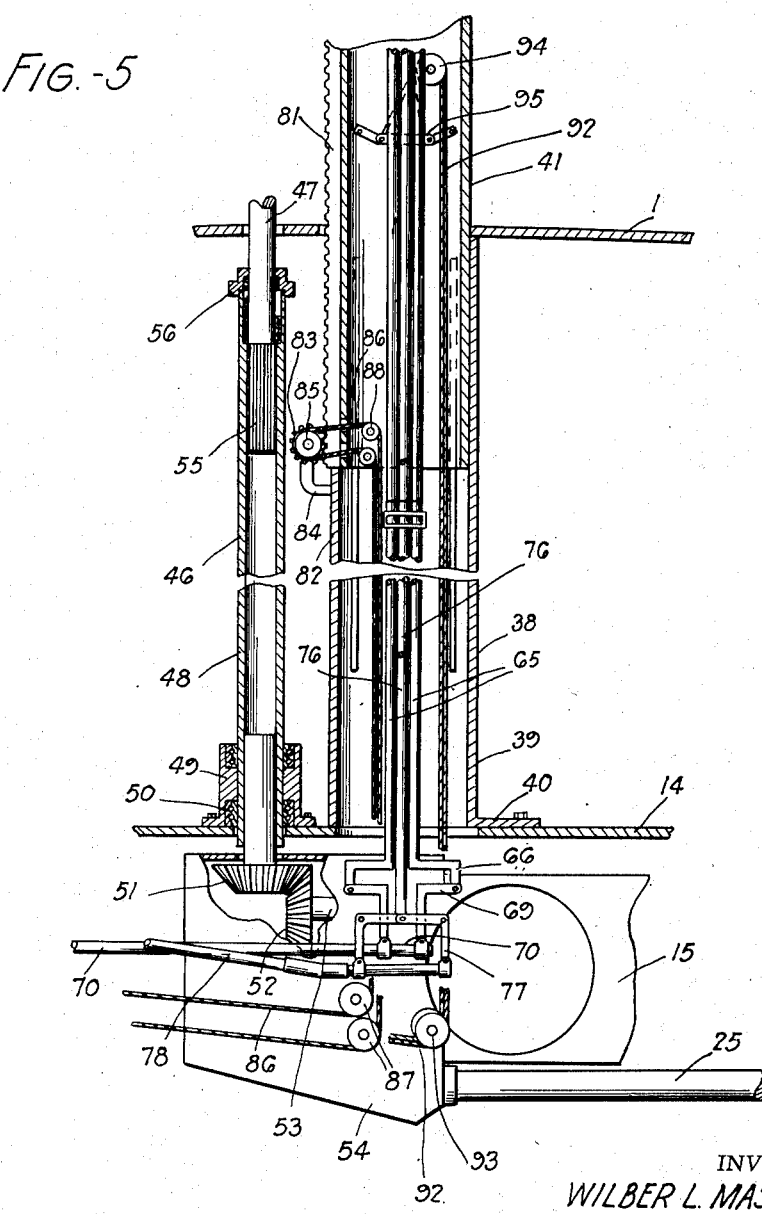
Figure 5 is a vertical section through the lower portion of my propeller and hub and controls and drive means.

Mounted in watertight compartments 29 under the body adjacent the front are a pair of resilient tired front wheels 30 so that the vehicle has three point traction support both for travelling over a road, and for landing when used as an aeroplane. The front two wheels engage the bank of a body of water when the vehicle is used as a boat. The front wheels 30 are connected by a steering radius bar 31, and one wheel has a direct steering knuckle and lever connection 32 to the steering wheel 33 located in front of the front seat in the cabin so that the vehicle may be steered. Giving access to the space in the top of the body above the cabin are a pair of hinged automatic doors 34 with handles 35. The doors 34 are provided with cutout portions 340 and 341 respectively (Fig. 2), which are hinged at 342 to the doors 34 so that when the propelling mechanism is raised outwardly of the body the doors 34 may be closed and the cutout portions engage the propelling mechanism. Thus the top of the body is closed when the vehicle is in use as an airplane. A hood and instrument panel 36 is provided over the steering wheel 33. The bottom section has removable panels 37.

Rising vertically through the cabin and body back of the front seat is the propeller column 38. Column 38 has a lower cylindrical section 39, bolted to the floor as at 40 and an upper slidably mounted telescoping cylindrical section 41 carrying the spherical propeller head 42 from which extend the propeller hubs 43 to which are pivotally connected, as at 44, the propellers 45. Also rising vertically through the cabin and body is a propeller drive shaft 46 which is parallel and adjacent to column 38 and is formed with upper and lower telescoping sections 47 and 48, respectively, and which extends through a journal 49 bolted to the floor.

Referring now more particularly to Figures 3, 4, 5 and 6: the journal 49 has an anti-friction supporting bearing 50, and shaft section 48 carries a beveled gear 51 at its lower end meshing with bevel gear 52 on shaft 53 to the power plant 15. A clutch device (not shown) in the housing 54 between shafts 53 and 25 permits driving only one shaft at a time, and this clutch device is preferably operable to actuate the propellers when the device is not driven as a ground vehicle. The upper section 47 is splined as at 55 for sliding movement only in shaft section 48, and a cap 56 is provided on section 48.

Mounted on the top end of section 41 of column 38 is a tapered anti-friction bearing 57, below which is the circular rotor 58 carrying the upper propeller hub 43. Oil cavities 59 are provided on the rotor. There are two sets of blade pitch controls used on my improved vehicle. The first set is used to steer the vehicle forward, to the left or right and rearwardly. The following description pertains to the blade pitch control for steering my improved vehicle. Each hub 43 has formed thereon a pitch changing arm 60 pivotally connected to a bell crank lever 61. The levers 61 on their lower ends are connected with an annular member 610, Fig. 4, which is provided with an annular groove to slidably receive the upstanding upper marginal edge 62 of an annular ring member 620, Fig. 4, which is concentric with section 41. The ring being connected by a link 63 to a bell crank lever 64 on the pitch changing rods 65. Thus as the hubs 58 and propellers 45 rotate the socket of the lever 61 slides about the ring. Bell cranks 64 are pivotally mounted in brackets 66. Each rod 65 has an L-shaped extension 66 at its lower end connected by bell-crank levers 69 with a pitch changing rod 70 having an arm 71 pivoted at 72 to the enlarged end 73 of the steering wheel shaft 74, whereby pitch is changed by manipulating the steering wheel 33. By pushing shaft 74 forward the pitch is increased at the rear of the hub assembly propelling the vehicle forward. For reverse, the shaft 74 is pulled upwardly increasing the pitch at the front of the hub assembly propelling the vehicle rearwardly. By turning the wheel 33 to the left, the pitch is increased on the right side for the left turn and vice versa for a right turn. Thus the vehicle is steered by the change of the pitch of the blades as above described.

The second set of blade pitch controls is to control the speed of the vehicle and the following description relates to this set of pitch controls. The greater the speed of the motor the greater the pitch and vice versa depending upon the speed of the engine in R. P. M. Pivoted at their upper ends to brackets 75 are speed pitch control rods 76 which have pivoted to their lower ends the bell-cranks 77 connected with the speed pitch control rod 78 which are connected through links and levers 79 with the operating handle 80. The upper section 41 carries a rack 81, and the lower section 38 has a slot 82 to permit the rack to slide up and down. A cog 83 on the arm 84 of the lower section has a pulley 85 over which is trained a cable 86, the lengths of which pass over pulley 87. Idler pulleys 88 are provided, and the cable 86 passes over drum 89 operated by raising and lowering lever 90. Idlers 91 are provided adjacent drum 89. Cables 92 leading over idlers 93 from the steering wheel rod 74 and up over idlers 94 to arms 95 throw out the clutch (not shown) for the propellers when the vehicle is used as a road vehicle.

It will be noted that the propeller blades are mounted in units of two propellers on the rotors 58, one above the other, and that the operating structure as described for one unit applies to the other. Each rotor 58 carries a bevel ring gear 96, which gears are opposed and operatively engaged by a synchronizing gear 97 so that the units are reversed as to rotation.

The lower rotor 58 is driven through ring 98 by upper shaft section 47. The propellers 45 are pivoted to the hubs 43 as at 44, by bolts 99. A spring locking device 100—see Figure 6—is provided for holding the propellers extended. Each locking device 100 includes a slidable pin 101 with a clamping hand 102 mounted on a sleeve 103 and normally pressed to clamping position in a slot 104 in the hub by a spring 105. An operating lever 106 is provided to move the pin and clamping hand.

From the foregoing it is believed that the operation and advantages of my invention will be apparent, but it is again pointed out that interpretation of its scope should only be conclusive when made in the light of the subjoined claim.

I claim:

A combined vehicle for air, ground and water travel, comprising a body formed with upper and lower sections joined at their longitudinally extending meeting edges, a bumper member on said sections at their meeting edges, a cabin in the body having walls spaced from the walls of the body to form compartments above and below the cabin, a power plant in the compartment below the cabin, a propeller assembly movably mounted in the compartment above the cabin so that the assembly can be moved to a position above the body and to a passive position within the compartment above the cabin, waterproof bottom depressions in the body fore and aft of the cabin, traction wheels mounted in the depressions, doors oppositely hinged to each other in the upper part of the body to permit upward movement of the propeller assembly and to cover the assembly when in passive position, means for connecting the propeller assembly and traction wheels to the power plant, and means for steering certain of the traction wheels.

WILBUR L. MASTERSON.

REFERENCES CITED

The following references are of record in the file of this patent:

UNITED STATES PATENTS

| Number | Name | Date |
|---|---|---|
| 1,286,679 | Longobardi | Dec. 3, 1918 |
| 1,527,666 | Berliner | Feb. 24, 1925 |
| 1,579,656 | Harpstrite | Apr. 6, 1926 |
| 2,008,843 | Smith | July 23, 1935 |
| 2,068,774 | Smith | Jan. 26, 1937 |
| 2,162,066 | De Asis | June 13, 1939 |
| 2,263,365 | Nicolaus et al. | Nov. 18, 1941 |
| 2,367,230 | McCoy | Jan. 16, 1945 |
| 2,377,457 | Stalker | June 5, 1945 |
| 2,424,769 | Page | July 29, 1947 |
| 2,429,975 | Avery | Nov. 4, 1947 |